(12) United States Patent
Tanioka et al.

(10) Patent No.: US 10,256,710 B2
(45) Date of Patent: Apr. 9, 2019

(54) LINEAR ACTUATOR

(71) Applicant: HARMONIC DRIVE SYSTEMS INC., Shinagawa-ku, Tokyo (JP)

(72) Inventors: Nozomu Tanioka, Azumino (JP); Syuhei Kobayashi, Azumino (JP)

(73) Assignee: Harmonic Drive Systems Inc., Shinagawa-ku, Tokyo (JP)

( * ) Notice: Subject to any disclaimer, the term of this patent is extended or adjusted under 35 U.S.C. 154(b) by 281 days.

(21) Appl. No.: 15/301,971

(22) PCT Filed: Apr. 7, 2014

(86) PCT No.: PCT/JP2014/060128
§ 371 (c)(1),
(2) Date: Oct. 5, 2016

(87) PCT Pub. No.: WO2015/155825
PCT Pub. Date: Oct. 15, 2015

(65) Prior Publication Data
US 2017/0126111 A1 May 4, 2017

(51) Int. Cl.
*H02K 1/17* (2006.01)
*H02K 1/24* (2006.01)
(Continued)

(52) U.S. Cl.
CPC .............. *H02K 41/02* (2013.01); *H02K 1/17* (2013.01); *H02K 1/34* (2013.01); *H02K 11/22* (2016.01); *H02K 41/031* (2013.01); *H02K 1/24* (2013.01)

(58) Field of Classification Search
CPC ...... H02K 41/02; H02K 41/031; H02K 11/22; H02K 1/17; H02K 1/34; H02K 1/24
(Continued)

(56) References Cited

U.S. PATENT DOCUMENTS 8,269,379 B2 * 9/2012 Dong ............... H02K 33/16
310/25
9,543,816 B2 * 1/2017 Nakamura ............ H02K 33/00
(Continued)

FOREIGN PATENT DOCUMENTS

JP 2004-015863 A 1/2004
JP 2004015863 A * 1/2004 ......... H02K 41/0356
(Continued)

OTHER PUBLICATIONS

International Search Report (PCT/ISA/210) dated Jun. 17, 2014, by the Japanese Patent Office as the International Searching Authority for International Application No. PCT/JP2014/060128.

*Primary Examiner* — Forrest M Phillips
(74) *Attorney, Agent, or Firm* — Buchanan Ingersoll & Rooney PC

(57) ABSTRACT

In a magnetic drive linear actuator, a load attachment portion is fixed to the lower side portion of the rectangular tubular coil frame of a mover, and a light-emitting portion of a position detection portion for detecting the movement position of the mover is fixed to the upper side portion of the coil frame. The load attachment portion and the upper side portion of the coil frame are mutually coupled through beam portions bridged there between. This makes it possible to prevent or suppress the behaviors of the load attachment portion and light-emitting portion from being shifted to each other during high-acceleration driving of the mover, thereby improving the responsiveness and positioning accuracy of the linear actuator.

8 Claims, 4 Drawing Sheets

(51) Int. Cl.
*H02K 1/34* (2006.01)
*H02K 11/22* (2016.01)
*H02K 41/02* (2006.01)
*H02K 41/03* (2006.01)

(58) Field of Classification Search
USPC .......................................................... 310/14
See application file for complete search history.

(56) References Cited

U.S. PATENT DOCUMENTS

| | | | |
|---|---|---|---|
| 9,800,128 B2 * | 10/2017 | Maruyama | G02B 7/023 |
| 2005/0206245 A1 | 9/2005 | Yoshida | |
| 2006/0028072 A1 * | 2/2006 | Iwasa | H02K 33/00 |
| | | | 310/14 |
| 2008/0024015 A1 * | 1/2008 | Tanioka | H02K 41/0356 |
| | | | 310/14 |
| 2010/0000482 A1 * | 1/2010 | Golz | F01L 13/0036 |
| | | | 123/90.31 |

FOREIGN PATENT DOCUMENTS

| | | | |
|---|---|---|---|
| JP | 2008-035645 A | 2/2008 | |
| JP | 2008035645 A * | 2/2008 | ......... H02K 41/0356 |

\* cited by examiner

LINEAR ACTUATOR

TECHNICAL FIELD

The present invention relates to a linear actuator employing a voice coil motor, for producing reciprocating motion on a linear path.

BACKGROUND ART

Linear actuators that employ voice coil motors in order to move lenses and the like with good response are widely employed for the purpose of carrying out focusing or the like. In a magnetic drive linear actuator, a mover is supported by a linear guide or the like so as to be capable of linear movement, and a support for attaching a lens or other element to be driven is fastened to the mover.

Typically, a requirement of a magnetic drive linear actuator is the ability to cause a lens or other such load to perform linear movement within a very small range, at good responsiveness and high accuracy of positioning. In Patent Document 1, the inventors of the present invention proposed a magnetic drive linear actuator with the aim of improving the accuracy of positioning and improving durability.

This linear actuator has a rectangular tubular coil frame, inside which are arranged a load attachment portion, a linear guide, and a sensor portion for detecting the position of the mover, with the center of gravity of the mover and the center of support of the linear guide being aligned. Also, the center of generation of magnetic force (thrust force) acting on the mover is aligned with the center of gravity of the mover. In so doing, a moment bearing on a section of the linear guide can be reduced, and the mover can be positioned at good responsiveness and high accuracy of positioning. Also, a moment acting on the linear guide which supports the mover is reduced, whereby the durability of the linear actuator can be improved.

Patent Document 1: JP 2008-35645 A

DISCLOSURE OF THE INVENTION

Problems to be Solved by the Invention

In the linear actuator of the aforedescribed configuration, there are instances in which high-speed acceleration driving of the mover, and hence of a lens or other component carried thereon, is required. In such instances, due to insufficient rigidity of the coil frame, it may not be possible for the load attachment portion which carries the lens or the like to be positioned at good responsiveness and high accuracy of positioning.

Specifically, inside the rectangular tubular coil frame, the load attachment portion is fastened to a frame section on one side, and the sensor portion is fastened to a frame section on the other side, sandwiching the linear guide. The load attachment portion and the sensor portion are situated at locations away in an orthogonal direction with respect to the movement direction of the mover.

For this reason, at times of high-speed acceleration driving, disparity in behavior between the load attachment portion and the sensor portion may arise due to flexing of the coil frame or the like. Even when the linear actuator is controlled such that an input command signal for driving and a sensor position signal output by the sensor and indicating the position of the mover (the load attachment portion) are aligned, there are instances in which the load cannot be positioned at the position indicated by the input command, due to this disparity of behavior. Such disparity of behavior is greater during movement at high acceleration.

Additionally, in this linear actuator there is a risk that a phenomenon may arise whereby, due to the effects of sliding resistance of the linear guide or the like, the load attachment portion does not move even at times of micro-input response from a substantially stationary state.

It is possible to reduce the level of such disparity by increasing the rigidity of the coil frame. However, increasing the rigidity requires taking measures such as making the coil frame thicker, and there is an associated appreciable increase of the weight of the mover. An appreciable increase of the weight of the mover is a significant obstacle to high-speed acceleration driving, and is therefore undesirable.

With the foregoing in view, it is an object of the present invention to provide a linear actuator with which the rigidity of the mover is increased while minimizing any increase in weight of the mover, and positioning action through high-speed acceleration driving can take place at good responsiveness and high accuracy of positioning.

Means to Solve the Problems

In order to solve the aforementioned problem, the linear actuator of the present invention is characterized by having:

a tubular mover having a tubular coil frame and a drive coil wound onto the coil frame;

a stator having a magnet for generating thrust force to move the mover along a linear path parallel to a center axis thereof in relation to the drive coil through which an excitation current flows;

a linear motion bearing for supporting the mover movably along the linear path at an inside of the coil frame;

a load attachment portion attached to a first frame section that, together with a second frame section, constitutes sections mutually opposed to either side of the linear motion bearing in the coil frame are the first frame section and a second frame section;

a position detection portion having a moving-side detection portion attached to the second frame section, the position detection portion detecting a movement position of the mover on the linear path; and beam portions bridging between the first frame section or the load attachment portion, and the second frame section or the moving-side detection portion.

In the linear actuator of the present invention, beam portions bridge between the load attachment portion and the moving-side detection portion which are set apart from one another with the linear motion bearing therebetween. Consequently, positional disparity of the load attachment portion and the moving-side detection portion occurring back and forth in the movement direction during movement of the mover can be prevented or minimized. In so doing, diminished responsiveness in positioning control and diminished positioning accuracy at times of high-speed acceleration, micro-driving from a stationary state, or the like, can be prevented or minimized.

As the beam portions, there can be employed members which are separate from the constituent members of the load attachment portion and the moving-side detection portion, these members being fastened to both a constituent member of the load attachment portion and a constituent member of the moving-side detection portion by implements such as screws or the like, adhesives, or other fasteners. In cases in which implements such as screws are employed, there may be instances in which heavy implements which would provide strong fastening power cannot be used, in order to reduce weight. In such cases, abutting portions capable of abutting in the direction of movement of the mover may be disposed between the beam portions, and the first frame section of the load attachment portion, and between the beam portion and the second frame section, or the moving-side detection portion.

It is preferable for the beams to be plate-shaped members that are lightweight, and to have prescribed width in the movement direction, such that rigidity is high in the movement direction of the mover.

With a view to enhancing responsiveness and accuracy of positioning of the linear actuator, it is preferable for the center of support of the mover by the linear motion bearing, and the center of generation of the thrust acting on the mover, to be aligned with the center of gravity of the mover, as seen from the direction of the center axis.

For this reason, it is preferable for the mover, the load attachment portion, a moving-side bearing portion attached to the mover in the linear motion bearing, the moving-side detection portion, and the beam portions to have structures which are left-right symmetrical with respect to a plane that includes the center axis and extends towards the first and second frame sections.

In this instance, in the linear actuator of the present invention, the rigidity of the mover is increased by the addition of the beam portions. By adding the beam portions to the mover, there is a commensurate increase in weight of the mover. Accordingly, in the linear actuator of the present invention, it is preferable for the moving-side detection portion to be attached to the outer peripheral surface of the second frame section, for a stationary-side detector portion attached to the stator side of the position detection portion to face the second frame section from the opposite side with respect to the moving-side detection portion, and for the linear motion bearing to be positioned between the load attachment portion and the second frame section.

By arranging the position detection portion outside the tubular coil frame, the gap between the first and second sections of the coil frame can be narrowed, and the coil frame can be made lighter and more rigid. Additionally, because the beam portions bridging between the first and second frame sections can be short, they can be reduced in weight and increased in rigidity. In so doing, the increase in weight of the mover due to arranging the beam portions can be kept to a minimum, and the rigidity of the mover overall can be increased.

In cases in which the position detection portion is arranged to the outside of the tubular coil frame, restrictions as to installation space are relaxed as compared with the case of arrangement to the inside, and the degree of freedom in design is higher. This is advantageous in terms of cutting costs and reducing noises of the detection output of the position detection portion.

The position detection portion preferably includes a light-emitting portion and a light-receiving portion which are arranged in opposition; and a light-blocking portion for preventing ambient light from infiltrating the light-receiving portion. The light-emitting portion is the moving-side detection portion, and the light-receiving portion is the stationary side detection portion. The light-blocking portion includes a light-emitting-side light-blocking portion situated on the light-emitting portion side, and a light-receiving-side light-blocking portion situated on the light-receiving portion side. The light-emitting-side light-blocking portion includes a light-emitting-side protruding portion that protrudes towards the light-receiving-side light-blocking portion side so as to surround a light-emitting surface of a light-emitting element of the light-emitting portion, and the light-receiving-side light-blocking portion includes a light-receiving-side protruding portion that protrudes towards the light-emitting-side light-blocking portion so as to surround a light-receiving surface of a light-receiving element of the light-receiving portion. At least a distal end section of the light-emitting-side protruding portion intrudes inside the light-receiving-side protruding portion.

In cases in which, inter alia, a lens for transmitting irradiating light such as a laser light or the like is carried on the load attachment portion, the irradiating light might infiltrate into the position detection portion along the beam portions. By arranging the light-emitting-side light-blocking portion and the light-receiving-side light-blocking portion in a state such that these portions intrude into one another between the light-emitting portion and the light-receiving portion, such infiltration of ambient light to the light-receiving surface of the light-receiving portion can be reliably prevented. In so doing, a decline in the S/N ratio of the position detection portion due to the provision of the beam portions can be avoided or suppressed.

MODE FOR CARRYING OUT THE INVENTION

Following is a description of an embodiment of a magnetic drive linear actuator to which the present invention has been applied, made with reference to the drawings.

(Overall Configuration)

Figure 1:
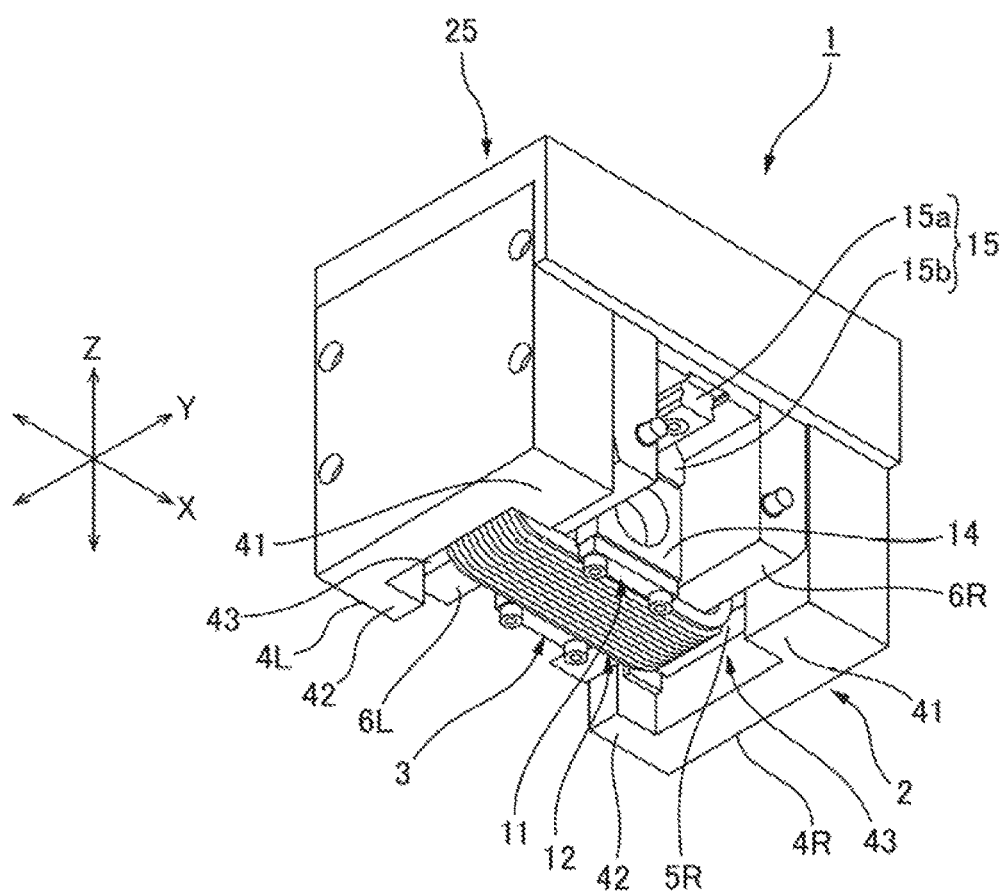
FIG. 1 is an exterior perspective view showing a linear actuator to which the present invention has been applied, seen from the bottom side looking from the front.
Figure 2B:
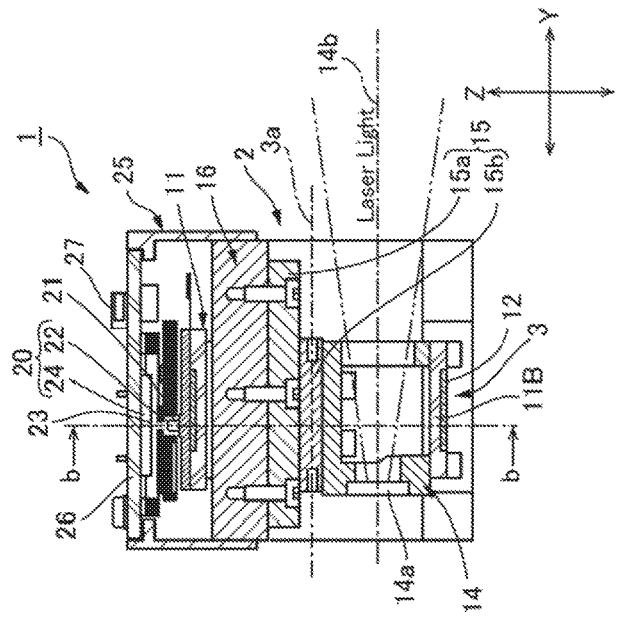
FIGS. 2(A)-2(C) are longitudinal cross-sectional view, a transverse cross-sectional view, and a bottom view of the linear actuator of FIG. 1.
Figure 2A:
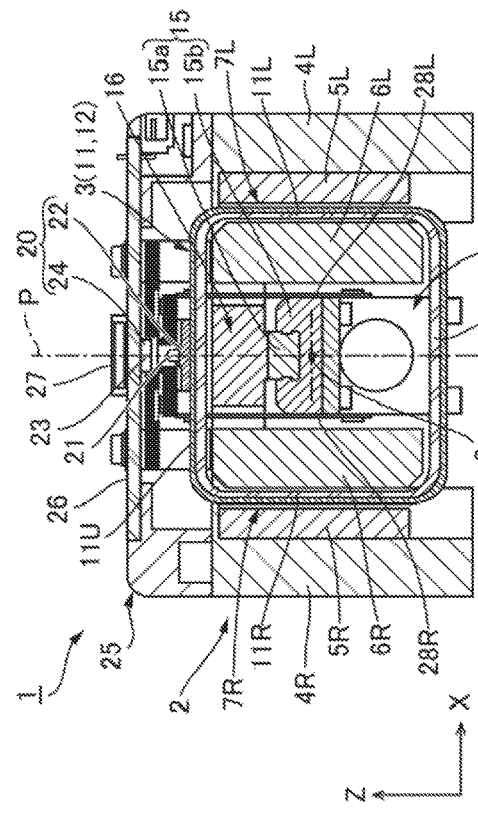
Figure 2C:
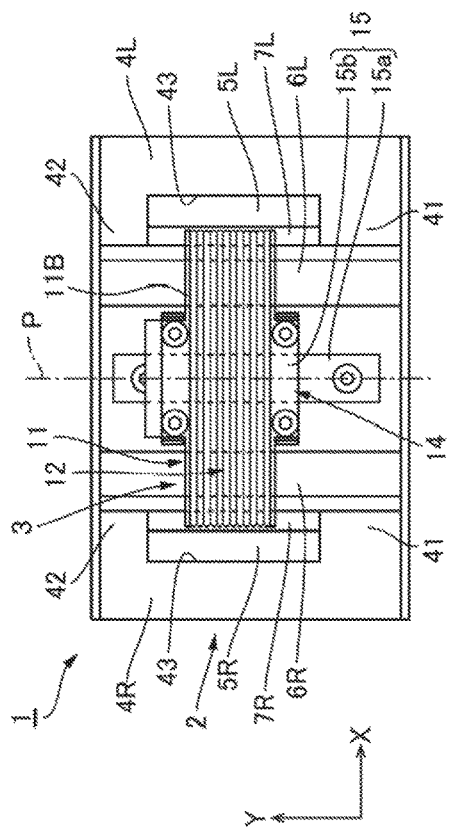

FIG. 1 is an exterior perspective view showing a linear actuator to which the present invention has been applied, seen from the bottom side looking from the front. FIGS. 2 (*a*), (*b*) and (*c*) are respectively a longitudinal cross-sectional view, a transverse cross-sectional view, and a bottom view of the linear actuator. FIG. 3 (*a*) is a perspective view showing a mover assembly. For convenience in the following description, the direction of an arrow X is designated as the width direction, the direction of an arrow Y orthogonal thereto is designated as the lengthwise direction, and the direction of an arrow Z orthogonal to arrows X and Y is designated as the vertical direction.

The linear actuator 1 is constituted by a voice coil motor having a stator 2 and a mover 3, and has a structure that is basically left-right symmetrical. The stator 2 has a pair of outer yokes 4L, 4R, a pair of permanent magnets 5L, 5R, and a pair of inner yokes 6L, 6R. The outer yokes 4L, 4R are rectangular plates of fixed thickness extending in the lengthwise direction Y, the lengthwise edges of which constitute protruding parts 41, 42 that protrude inward at right angles; between these are formed recesses 43 of constant depth extending in the vertical direction Z. The permanent magnets 5L, 5R of rectangular shape are respectively attached within the recesses 43.

The inner yokes 6L, 6R are fastened to the outer yokes 4L, 4R, in a state with the inside end surfaces of the lengthwise protruding parts 41, 42 of the outer yokes 4L, 4R in intimate contact against the lengthwise outside end surfaces. The depth of the recesses 43 is greater than the thickness of the permanent magnets 5L, 5R, and therefore a gap 7L of constant width extends in the lengthwise direction between the permanent magnet 5L and the inner yoke 6L facing same. Likewise, a gap 7R of constant width extends in the lengthwise direction between the permanent magnet 5R and the inner yoke 6R which faces it.

The mover 3 is arranged between the left and right permanent magnets 5L, 5R of the stator 2, and includes a coil frame 11 of rectangular tubular shape, and a drive coil 12 wound in a circumferential direction about the outer peripheral surface thereof. The inner yokes 6L, 6R are positioned at left and right inside the coil frame 11, and a left-side section 11L and a right-side section 11R which extend in the vertical direction Z of the coil frame 11 are passed through the gaps 7L, 7R between the permanent magnets 5L, 5R and the inner yokes 6L, 6R. Sections of the drive coil 12 which are wound onto the left-side section 11L and the right-side section 11R face the left and right permanent magnets 5L, 5R across constant gaps. An upper-side section 11U and a bottom-side section 11B extending in the width direction X of the coil frame 11 are arranged along the upper side and the lower side of the inner yokes 6L, 6R.

A load attachment portion 14 and a linear motion bearing 15 are arranged inside the coil frame 11. The load attachment portion 14 is attached to an inner peripheral surface (upward-facing surface) of the bottom-side section 11B (first frame section) of the coil frame 11. The load attachment portion 14 is, for example, a lens holder in which are formed a circular opening portion 14a serving as a lens attachment portion, and an optical path 14b extending to pass through in a direction parallel to a center axis 3a of the mover 3. The linear motion bearing 15 is arranged to the upper side of the load attachment portion 14, defines a linear path for the mover 3 parallel to the center axis 3a, and guides the mover 3 along the linear path.

The linear motion bearing 15 is provided with a guide rail 15a defining a linear path for the mover 3, and a slide 15b which is slidable along the guide rail 15a. The guide rail 15a is fastened to a bottom surface of a horizontal block 16 and extends on the horizontal in the lengthwise direction. The horizontal block 16 is arranged inside the coil frame 11 and attached between the left and right inner yokes 6L, 6R of the stator 2. The slider 15b is fastened by a bolt or the like to a horizontal upper surface formed on the load attachment portion 14 on the mover 3 side.

A position detection portion 20 for detection of the movement position of the mover 3 is arranged on the upper side of the drive coil 12. The position detection portion 20 has a light-emitting portion 22 provided with an LED 21, and a light-receiving portion 24 provided with a semiconductor position detection element (PSD) 23. The light-emitting portion 22 is a movable-side detection portion attached to an outer peripheral surface (upward-facing surface) of the upper-side section 11U of the coil frame 11. The light-receiving portion 24 is a stationary-side detection portion, faces the light-emitting portion 22 from the upper side, and is attached to an inside lower surface of a light-blocking sensor cover 25 which covers an upper end portion of the linear actuator 1. A wiring substrate 26 for an external connection is attached to the upper surface of the light-blocking sensor cover 25. The wiring substrate 26 has wired connections to the light-emitting portion 22 and the light-receiving portion 24, and carries a connector 27 for external connection.

(Configuration of Beam Portions)

Figure 3A:
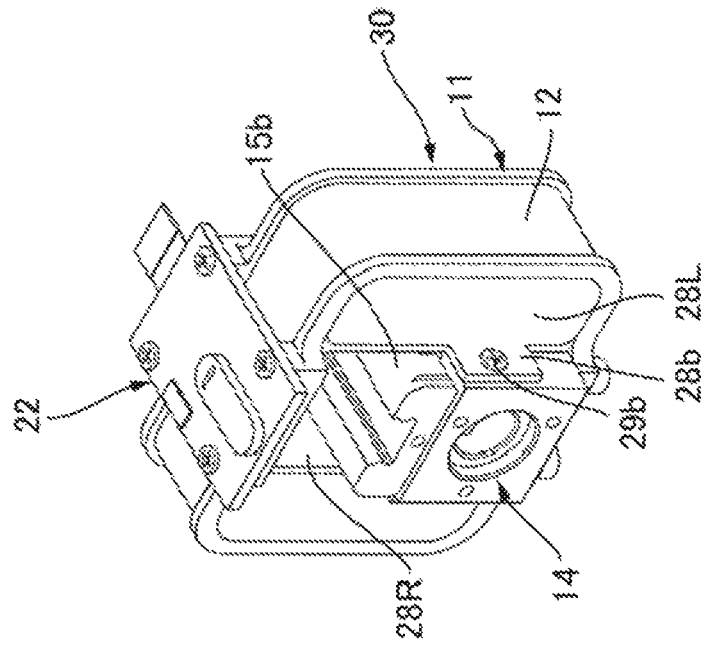
FIGS. 3(A) and 3(B) are perspective view showing two examples of a mover of the linear actuator of FIG. 1.
Figure 3B:
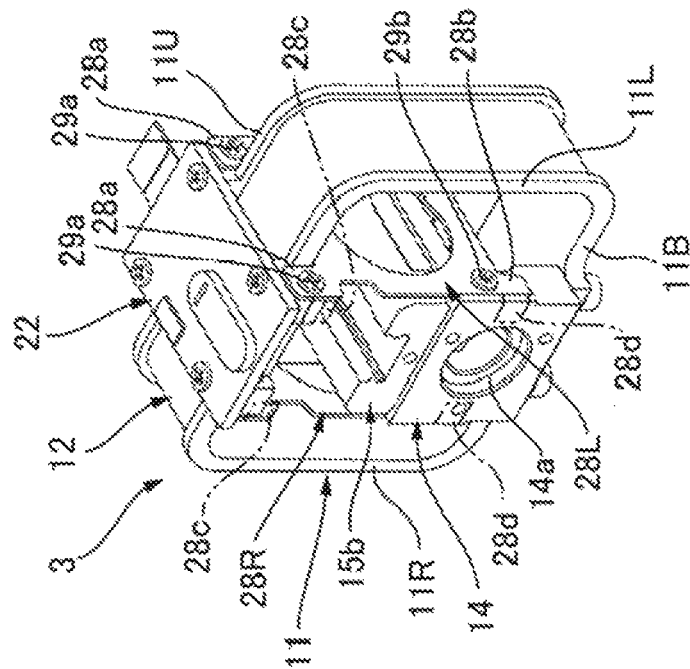

The distance between the upper-side section 11U of the coil frame 11 and the load attachment portion 14 attached to the bottom-side section 11B of the coil frame 11 is bridged by a pair of plate-shaped beam portions 28L, 28R extending in the vertical direction Z at both sides thereof. The beam portions 28L, 28R are left-right symmetrical in shape, and as will be understood from FIGS. 3(a) and 3(b) are provided with fastening plate sections 28a, 28b which protrude in the vertical direction at the lengthwise ends thereof, and have circular-shaped cutouts in center portions in order to lighten the weight.

The upper-side lengthwise pair of the fastening plate sections 28a are respectively fastened by screws 29a to left and right regions of the upper-side section 11U of the coil frame 11. As mentioned above, the light-emitting portion 22 is attached to this upper-side section 11U. The bottom-side lengthwise pair of the fastening plate sections 28a are respectively fastened by screws 29b to back end sections of left and right side surfaces of the load attachment portion 14. The load attachment portion 14 (bottom-side section 11B of the coil frame 11) and the light-emitting portion 22 (upper-side section 11U of the coil frame 11), which are spaced apart in the vertical direction Z and sandwich the linear motion bearing 15, are thus linked by the left and right beam portions 28L, 28R. The beam portions 28L, 28R are plate-shaped members, the rigidity of which in the direction of movement of the mover 3 (the lengthwise direction Y) is higher than that in the width direction X orthogonal thereto.

When excitation current flows to the drive coil 12 of the linear actuator 1, depending on the direction of energization, thrust force (electromagnetic force) for moving the mover 3 in the direction of the center axis 3a thereof is produced between the permanent magnets 5L, 5R and the drive coil 12. When the thrust force acts on the mover 3, the mover 3, guided by the linear motion bearing 15, moves in the lengthwise direction Y. The stroke of the mover 3 is defined by the lengthwise protruding portions 41, 42 of the outer yokes 4L, 4R.

As described above, the light-emitting portion 22 and the load attachment portion 14, which are spaced apart in the vertical direction Z which is a direction orthogonal to the direction of movement of the mover 3, are linked by the left and right beam portions 28L, 28R. Therefore, rigidity can be increased in the direction of movement of the rectangular tubular mover 3, and disparity in behavior between the load attachment portion 14 and the light-emitting portion 22 during movement of the mover 3 can be prevented or minimized. As a result, the position of the load attachment portion 14 (and hence of the lens or other load carried thereon), obtained from the output signal of the position detection portion 20, can be accurately detected. Therefore, the responsiveness and accuracy of positioning at times of high-speed acceleration or the like can be increased.

In the present example, separate members from the load attachment portion 14 and the light-emitting portion 22 (movable-side detection portion) are used as the beam portions 28L, 28R, with both the load attachment portion 14 and the light-emitting portion 22 being fastened by employing implements such as the screws 29a, 29b, adhesives, or other fasteners. When implements such as the screws 29a, 29b are employed, there may be instances in which heavy implements which would provide strong fastening power cannot be used, in order to reduce weight. In such cases, abutting portions capable of abutting from the direction of movement of the mover 3 may be formed between the beam portions 28L, 28R and the bottom-side section 11B of coil frame 11, or the load attachment portion 14. Likewise, such portions may be formed between the beam portions 28L, 28R, and the upper-side section 11U of the coil frame 11 or the light-emitting portion 22. For example, the edges of the upper and lower fastening plate sections 28a, 28b of the beam portions 28L, 28R may be bent at right angles towards the inside in the width direction X in the manner indicated by hypothetical lines in FIG. 3 (a), to form abutting portions 28c, 28d.

FIG. 3 (b) is a perspective view showing another configuration example of a movable-side assembly including the mover 3. In the movable-side assembly shown in the drawing, the coil frame 11 and the beam portions 28L, 28R are formed by a single component 30. This obviates the need for fasteners such as the screws 29a to fasten the beam portions 28L, 28R to the light-emitting portion 22 side. Further, it is possible for the coil frame 11, the load attachment portion 14, and the beam portions 28L, 28R to be a single component in which these regions are integrally formed.

The present inventors conducted validation tests regarding the positioning accuracy of the linear actuator 1 equipped with the beam portions 28L, 28R. Linear actuators of two types were employed for comparison. One of these was a linear actuator of identical construction as the linear actuator 1, except for lacking the beam portions. Another was a linear actuator of identical construction as the linear actuator 1, except for lacking the beam portions, and employing a coil frame that was thicker than the coil frame 11. During high-speed acceleration, which in both of the linear actuators produced positioning disparities during positioning control, the linear actuator 1 of the present embodiment did not produce positioning disparities, thus demonstrating the effectiveness of the configuration of the present invention.

(Center of Gravity Position of Mover)

In the present embodiment, in order to increase the responsiveness and accuracy of positioning by the linear actuator 1, the center of support of the mover 3 by the linear motion bearing 15, and the center of generation of thrust acting on the mover 3, are aligned with the center of gravity of the mover 3, as seen from the direction of the center axis 3a of the mover 3. For this reason, the mover 3, the load attachment portion 14, the slider 15b of the linear motion bearing 15, the light-emitting portion 22, and the beam portions 28L, 28R have a left-right symmetrical structure with respect to a plane P extending in the vertical direction Z and including the center axis 3a, as shown in FIGS. 2 (a) and (c).

Because the center of gravity of the mover 3 is aligned with the center of support of the linear motion bearing 15, moment generated due to the weight of the mover itself acting on the linear motion bearing 15 can be reduced. Moreover, because the center of thrust acting on the mover 3 is aligned with the center of support of the linear motion bearing 15, moment produced in the linear motion bearing 15 by thrust acting on the mover 3 can be reduced. Consequently, in the linear actuator 1 of the present example, the action of unnecessary stress on the linear motion bearing 15 can be prevented or minimized, and sliding resistance of the mover 3 while guided by the linear motion bearing 15 can be reduced. As a result, the mover 3 can be moved with good responsiveness, and positioned with good accuracy. Additionally, unnecessary stress does not act on the linear motion bearing 15 or on other regions, and therefore the durability of the linear actuator 1 is improved.

(Position Detection Portion)

In the present embodiment, the beam portions 28L, 28R are added to increase the rigidity of the mover 3, and therefore the weight of the mover 3 is increased. However, the position detection portion 20 is arranged to the outside of the rectangular tubular mover 3. As compared with an arrangement in which the position detection portion 20 is inside the coil frame 11, the spacing between the upper-side section 11U and the bottom-side section 11B can be narrower, and the rigidity of the mover 3 can be increased. Moreover, the beam portions 28L, 28R bridging between the upper-side section 11U and the bottom-side section 11B in the coil frame 11 can be shorter, to achieve lower weight and higher rigidity. The rigidity of the mover 3 overall can be increased in this way, and any increase in the weight of the mover 3 due to arrangement of the beam portions 28L, 28R can be minimized. This is advantageous in terms of improving responsiveness and positioning accuracy at times of high-speed acceleration.

When the position detection portion 20 is arranged to the outside of the rectangular tubular mover 3, limitations as to the installation space are relaxed to a greater extent than when the position detection portion 20 is arranged to the inside, affording a higher degree of freedom of design. This is advantageous in terms of cutting costs and reducing noises of the detection output of the position detection portion.

(Light-Blocking Structure of Position Detection Portion)

Figure 4:
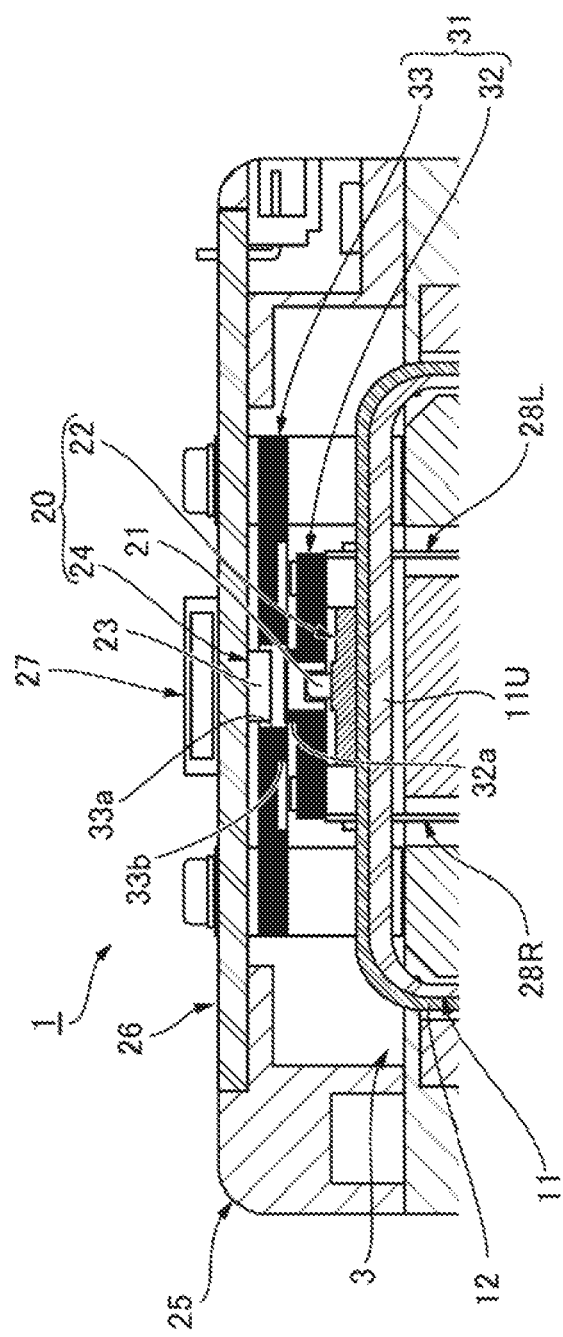
FIG. 4 is a partial cross-sectional view showing a position detection portion of the linear actuator of FIG. 1.

Next, FIG. 4 is an enlarged partial sectional view of a section of the position detection portion 20 of the linear actuator 1. The load attachment portion 14 of the linear actuator 1 is a lens holder for carrying a lens that transmits laser light or other irradiating light. In this case, a portion of the irradiating light traveling on an optical path 14b that passes lengthwise through the load attachment portion 14 might infiltrate the position detection portion 20 at either side thereof, to the upper side along the beam portions 28L, 28R that bridge in the vertical direction. In order to prevent such infiltration of ambient light, the position detection portion 20 is provided with a light-blocking structure such as the following.

The description makes reference to FIG. 4. The position detection portion 20 is equipped with a light-emitting portion 22 and a light-receiving portion 24 which are arranged facing in the vertical direction Z, and a light-blocking portion 31 for inhibiting infiltration of ambient light onto the light-receiving surface of a semiconductor position detection element 23 serving as the light-receiving element of the light-receiving portion 24.

The light-blocking portion 31 is provided with a light-emitting-side light-blocking plate 32 situated on the light-emitting portion 22 side, and a light-receiving-side light-blocking plate 33 situated on the light-receiving portion 24 side. The light-emitting-side light-blocking plate 32 is provided with a light-emitting-side protruding portion 32a that protrudes towards the light-receiving-side light-blocking plate 33 side so as to surround the light-emitting surface of an LED 21 serving as the light-emitting element of the light-emitting portion 22. A slit extending in the width direction is formed in the upper end of this light-emitting-side protruding portion 32a, and light exiting the LED 21 illuminates the light-receiving portion 24 via this slit.

The light-receiving-side light-blocking plate 33 is provided with an opening portion 33a where the semiconductor position detection element 23 serving as the light-receiving element of the light-receiving portion 24 is positioned, and a light-receiving-side protruding portion 33b which protrudes towards the light-emitting-side light-blocking plate 32 side so as to surround the opening portion 33a. As will be understood from FIG. 4, a distal end section of the light-emitting-side protruding portion 32a intrudes coaxially inside the light-receiving-side protruding portion 33b.

Thus, the light-emitting-side light-blocking plate 32 and the light-receiving-side light-blocking plate 33 are arranged in opposition in a state of mutual intrusion across a narrow gap between the light-emitting portion 22 and the light-receiving portion 24. Therefore, infiltration of ambient light to the light-receiving surface of the light-receiving portion 24 along the surfaces of the beam portions 28L, 28R on either side can be reliably prevented. In so doing, a decline in the S/N ratio of the position detection portion 20 due to the provision of the beam portions 28L, 28R can be avoided or minimized.

Additional Embodiments

In the examples above, a rectangular tubular mover is employed, but a mover of a tubular shape other than rectangular could be employed instead. For example, a mover of circular tubular shape could be employed.

Also, whereas the aforedescribed examples are examples in which the load attachment portion 14 is a lens holder, the linear actuator of the present invention can be employed for linear reciprocating movement of members besides lenses.

The invention claimed is:

1. A linear actuator comprising:
a tubular mover having a tubular coil frame and a drive coil wound onto the coil frame;
a stator having a magnet for generating thrust force to move the mover along a linear path parallel to a center axis of the mover in relation to the drive coil through which an excitation current flows;
a linear motion bearing for supporting the mover movably along the linear path at an inside of the coil frame;
a first frame section and a second frame section mutually opposed to each other in the coil frame in a state in which the linear motion bearing is sandwiched between the first and second frame sections;
a load attachment portion attached to the first frame section;
a position detection portion having a moving-side detection portion attached to the second frame section, the position detection portion detecting a movement position of the mover on the linear path;
beam portions bridging between the first frame section or the load attachment portion, and the second frame section or the moving-side detection portion;
a first fastening member for fastening the beam portions to the first frame section or the load attachment portion;
a second fastening member for fastening the beam portions to the second frame section or the moving-side detection portion;
first abutting portions configured to abut with each other in a direction of center axis of the mover, the first abutting portions being formed between the beam portions, and the first frame section of the load attachment portion; and
second abutting portions configured to abut with each other in the direction of center axis of the mover, the second abutting portions being formed between the beam portions and the second frame section or the movable-side detection portion.

2. The linear actuator according to claim 1, wherein the coil frame and the beam portions are integrally formed to constitute a single component part.

3. The linear actuator according to claim 1 wherein the coil frame, the load attachment portion and the beam portions are integrally formed to constitute a single component part.

4. The linear actuator according to claim 1, wherein the beam portions are plate-shaped members having a prescribed width in a direction of the center axis of the mover.

5. The linear actuator according to claim 1, wherein the movable-side detection portion is attached to an outer peripheral surface of the second frame section;
a stationary side detection portion of the position detection portion is attached to the stator side and faces the movable-side detection portion from a side opposite to the second frame section; and
the linear motion bearing is arranged between the load attachment portion and the second frame section.

6. The linear actuator according to claim 5, wherein the position detection portion includes a light-emitting portion and a light-receiving portion which are arranged in opposition, and a light-blocking portion for preventing ambient light from infiltrating the light-receiving portion;
the light-emitting portion is the moving-side detection portion, and the light-receiving portion is the stationary side detection portion;
the light-blocking portion includes a light-emitting-side light-blocking portion situated on the light-emitting portion side, and a light-receiving-side light-blocking portion situated on the light-receiving portion side;
the light-emitting-side light-blocking portion includes a light-emitting-side protruding portion that protrudes towards the light-receiving-side light-blocking portion side so as to surround a light-emitting surface of a light-emitting element of the light-emitting portion;
the light-receiving-side light-blocking portion includes a light-receiving-side protruding portion that protrudes towards the light-emitting-side light-blocking portion so as to surround a light-receiving surface of a light-receiving element of the light-receiving portion; and
at least a distal end section of the light-emitting-side protruding portion intrudes inside the light-receiving-side protruding portion.

7. The linear actuator according to claim 1, wherein a center of support of the mover by the linear motion bearing, and a center of generation of the thrust acting on the mover are aligned with a center of gravity of the mover, as seen from the direction of the center axis.

8. The linear actuator according to claim 7, wherein the mover, the load attachment portion, a moving-side bearing portion attached to the mover in the linear motion bearing, the moving-side detection portion, and the beam portions have structures which are left-right symmetrical with respect to a plane that includes the center axis and extends towards the first and second frame sections.

* * * * *